United States Patent [19]

Rentmeester et al.

[11] Patent Number: 4,840,009
[45] Date of Patent: Jun. 20, 1989

[54] ROTARY FILM SEALING AND SEVERING HEAD FOR THERMOPLASTICS

[75] Inventors: Alan L. Rentmeester, Green Bay; John M. Pamperin, Oneida, both of Wis.

[73] Assignee: FMC Corporation, Chicago, Ill.

[21] Appl. No.: 222,865

[22] Filed: Jul. 22, 1988

[51] Int. Cl.⁴ .................. B65B 51/26; B65B 51/30; B65B 51/16
[52] U.S. Cl. ........................ 53/373; 53/550; 53/552; 156/494; 156/496; 156/498; 156/582; 156/583.3
[58] Field of Search ............ 53/550, 373, 552; 156/582, 494, 496, 498, 583.3

[56] References Cited

U.S. PATENT DOCUMENTS

| | | | |
|---|---|---|---|
| 3,050,916 | 8/1962 | Gausman et al. | 53/552 |
| 3,057,129 | 10/1962 | Meissner | 53/550 X |
| 3,438,173 | 4/1969 | Omori | 53/373 X |
| 3,522,135 | 7/1970 | Page | 53/550 X |
| 3,850,780 | 11/1974 | Crawford et al. | 53/550 X |
| 4,048,003 | 9/1977 | Bolli | 156/582 X |
| 4,341,057 | 7/1982 | Limousin | 53/373 X |
| 4,512,138 | 4/1985 | Greenawalt | 53/373 X |
| 4,630,429 | 12/1986 | Christine | 53/373 X |
| 4,663,917 | 5/1987 | Taylor et al. | 53/552 |
| 4,750,313 | 6/1988 | Kammler et al. | 53/552 X |

Primary Examiner—Horace M. Culver
Attorney, Agent, or Firm—Lloyd B. Guernsey; R. C. Kamp; R. B. Megley

[57] ABSTRACT

A rotary film sealing and severing device for use with thermoplastic film for forming packages. The device includes a rotating anvil assembly and a counter-rotating film cutting assembly having a heated sealing and cutting knife. First and second liquid cooled clamping bars on either side of the knife hold the layers of film together while the film is being sealed and cut. Cooling the clamping bars prevents the film from adhering to the clamps and causes the layers of film to quickly fuse together and allows high speed operation by preventing separation of layers of film due to slow cooling.

5 Claims, 4 Drawing Sheets

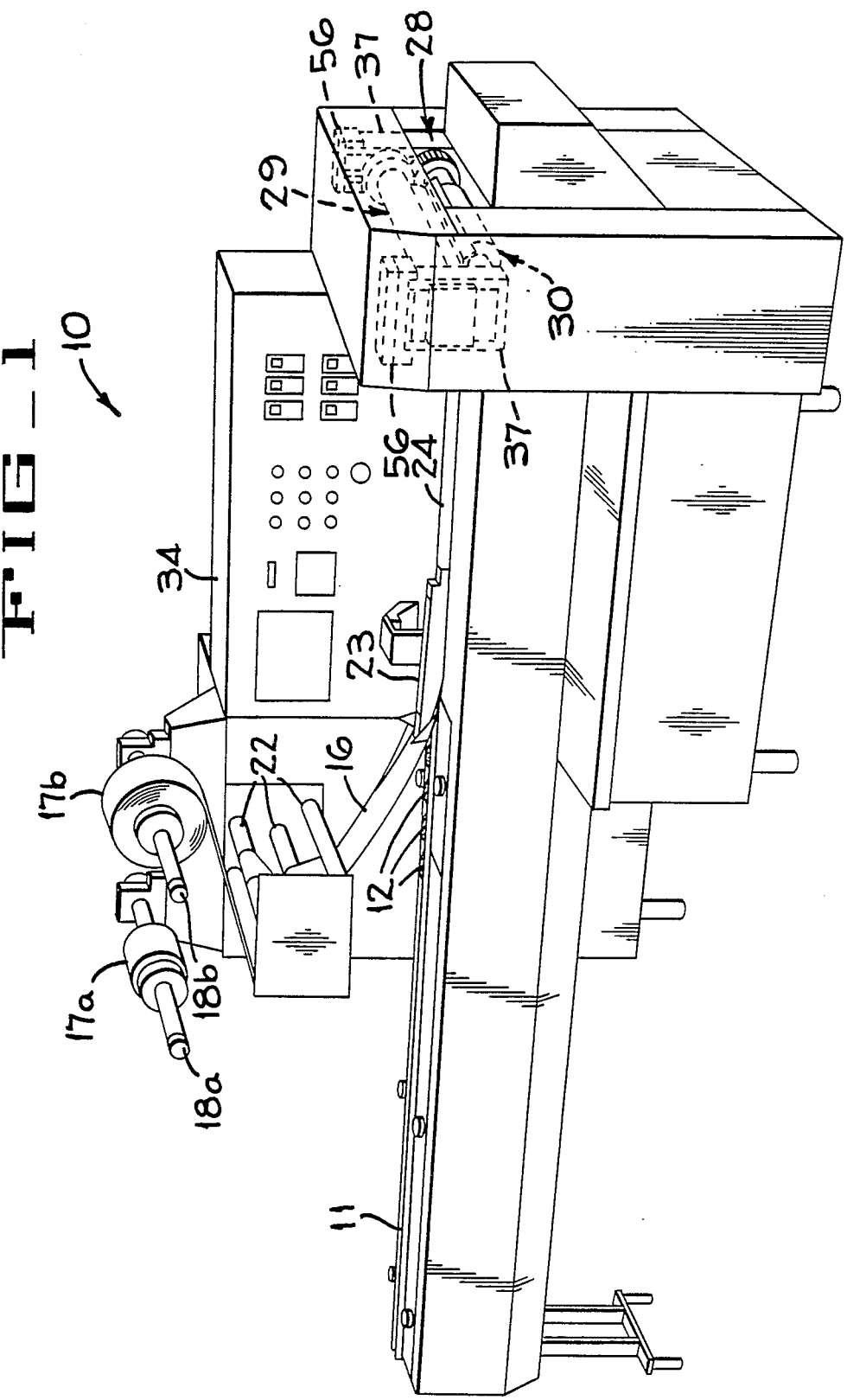

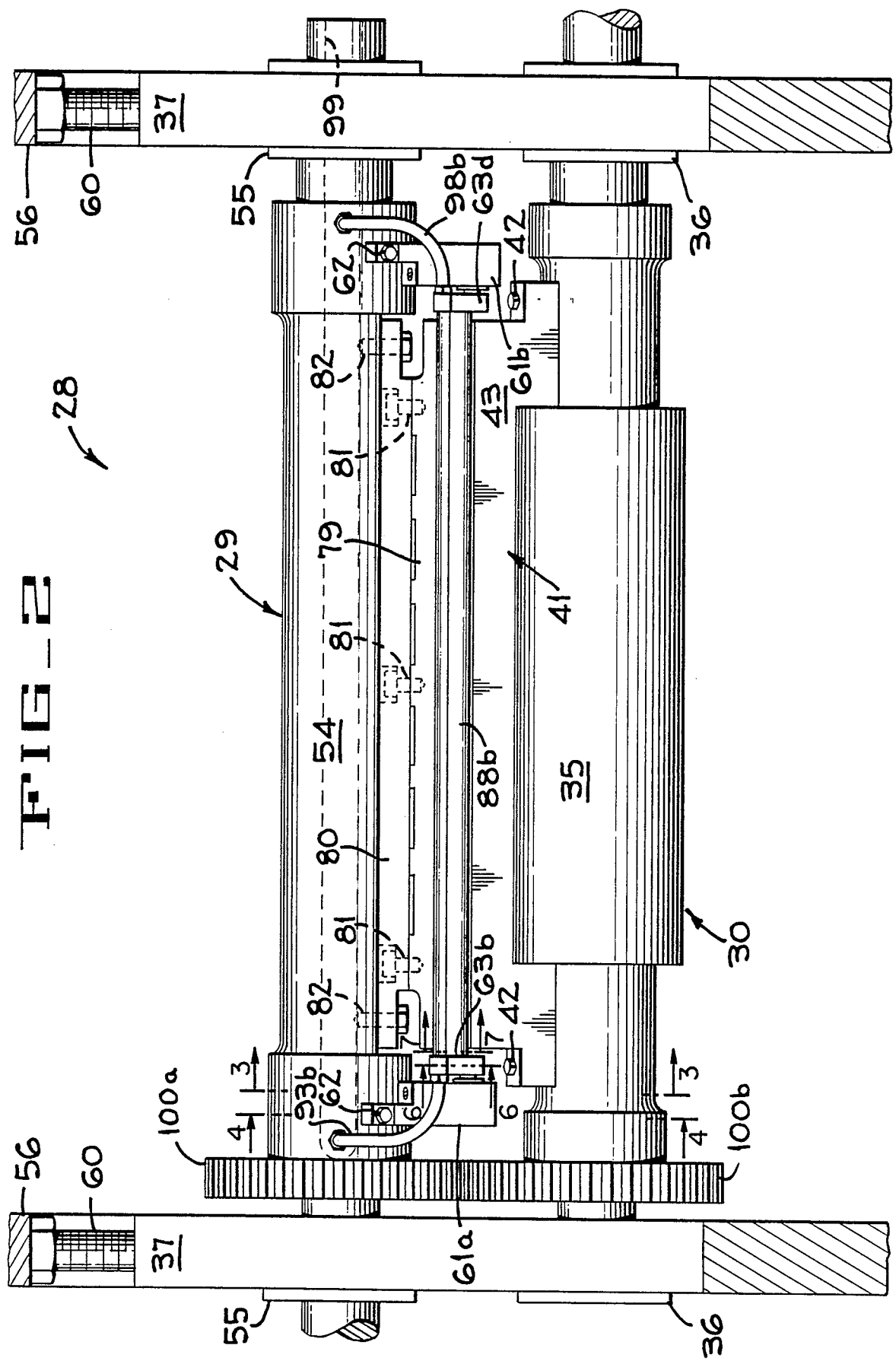

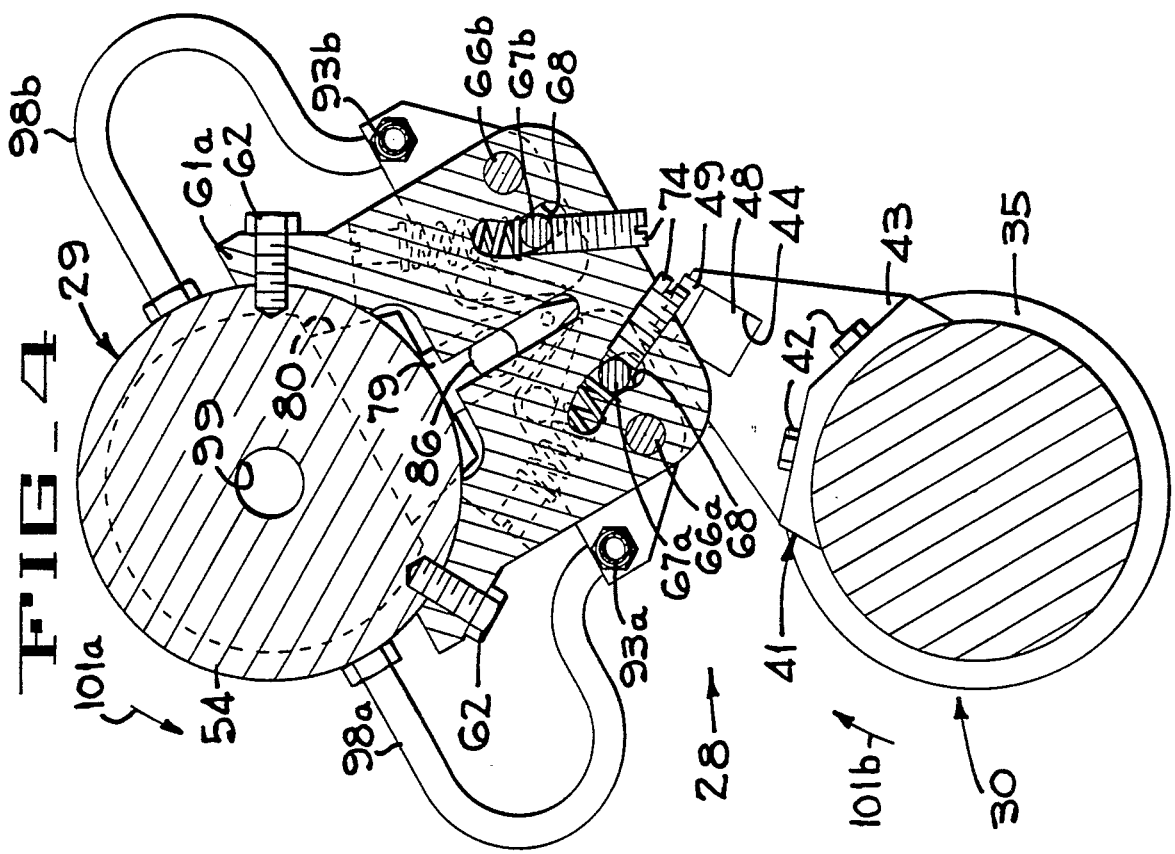
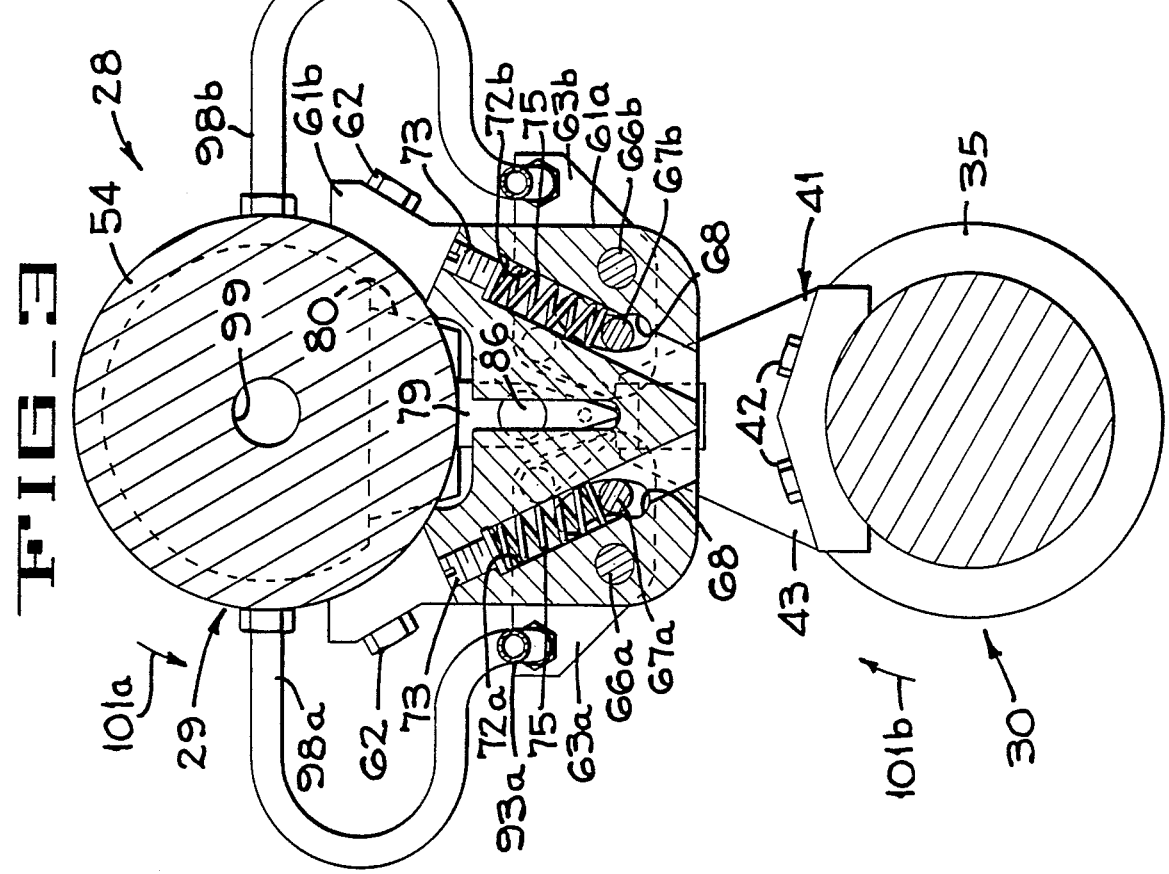

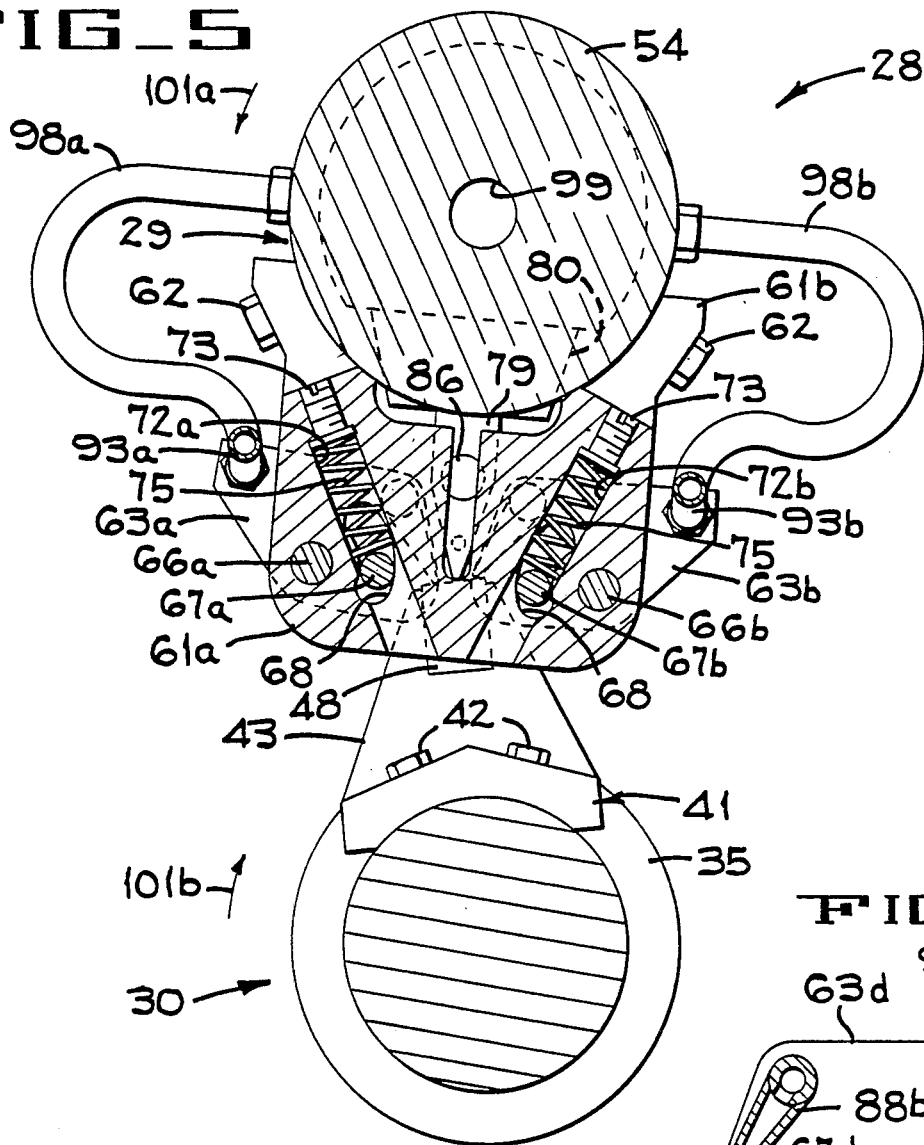
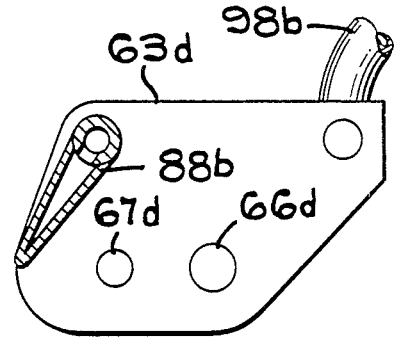
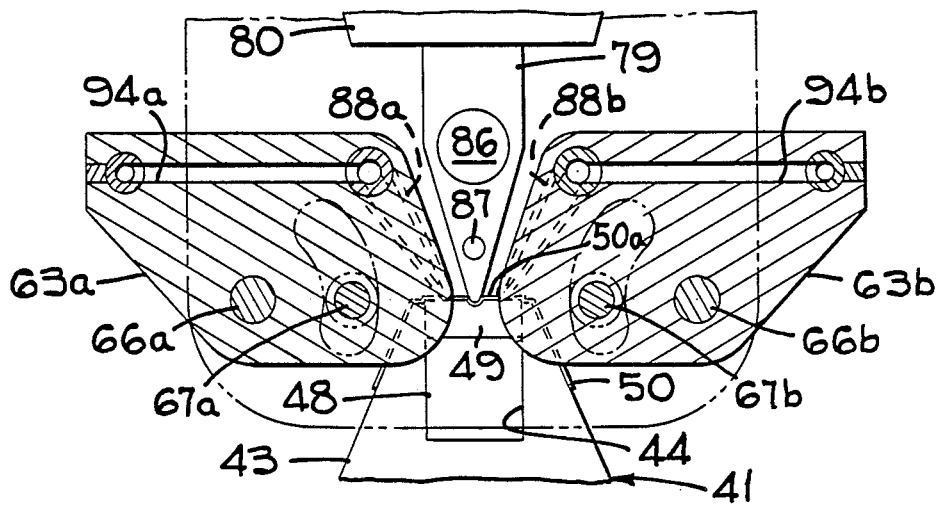

ROTARY FILM SEALING AND SEVERING HEAD FOR THERMOPLASTICS

BACKGROUND OF THE INVENTION

The present invention relates to horizontal wrapping machines, and more particularly to a device for heat sealing and severing thermoplastic film used for forming packages in such machines.

A wrapping machine in which the present invention can be used in disclosed in U.S. Pat. No. 4,712,357 issued to Crawford et al, Dec. 15, 1987. The wrapping machine feeds a succession of articles into a traveling tube of thermoplastic material which is sealed longitudinally and sealed and severed between the articles to produce individual hermetically sealed packages.

SUMMARY OF THE INVENTION

The present invention discloses an improved heat sealing and severing device for use in packaging articles in tubular thermoplastic. The device includes an anvil assembly rotatably mounted about a first rotational axis and having a slick resilient anvil surface spaced apart from the first rotational axis. A film cutting assembly having a heated knife and a pair of hollow film clamps is rotatable about a second rotational axis parallel with the first rotational axis. The film clamps are spaced apart and mounted parallel to the second rotational axis. The heated knife is mounted between the film clamps and parallel to the clamps. The film cutting assembly and the anvil assembly are synchronously rotated about their respective rotational axes so the film clamps and heated knife press against the anvil surface to seal and cut any thermoplastic on the anvil surface.

Springs bias the film clamps away from the second rotational axis so the film clamps press toward the anvil surface and contact the thermoplastic before the knife contacts the thermoplastic. This holds the thermoplastic securely while the knife performs the sealing and cutting action on the thermoplastic. Because the hot knife radiates heat to the film clamps a cooling liquid is circulated through the hollow film clamps to prevent the thermoplastic film from adhering to the clamps when sealing and cutting is done at a position close to the articles sealed in the thermoplastic. The cooled clamps also cool and set the film after sealing and cutting.

This provides smaller article packages because the clamps can be mounted closer to the hot knife, thus requiring a smaller amount of thermoplastic and a more secure seal. The cooler clamps allow the temperature of the hot knife to be increased, resulting in increaed sealing and cutting speeds.

BRIEF DESCRIPTION OF THE DRAWINGS

FIG. 1 is a perspective of the horizontal wrapping machine incorporating the rotary film sealing and severing device of the present invention.

FIG. 2 is a front elevation of the rotary film sealing and severing device of the present invention.

FIG. 3 is a sectional view taken along line 3—3 of FIG. 2.

FIG. 4 is a sectional view taken along line 4—4 of FIG. 2.

FIG. 5 is a sectional view similar to FIG. 3.

FIG. 6 is a sectional view taken along line 6—6 of FIG. 2.

FIG. 7 is a sectional view taken along line 7—7 of FIG. 2.

DESCRIPTION OF THE PREFERRED EMBODIMENT

A horizontal wrapping machine 10 in which the present invention can be used is shown in FIG. 1. Wrapping machine 10 includes a movable chain 11 for transporting a plurality of articles 12 to be wrapped in thermoplastic film 16 supplied from a pair of rolls 17a, 17b mounted on a pair of support shafts 18a, 18b. Film 16 is threaded over a plurality of rollers 22 and is engaged by forming device 23 which forms the sheet of film into a tube 24 surrounding articles 12. The tube 24 and the enclosed articles advance to a sealing and severing device 28 where it passes between a film cutting assembly 29 and an anvil assembly 30. The individual articles 12 are sealed inside film 16 and film 16 is sealed and severed between articles by device 28 to produce individually wrapped articles. Electronic control circuitry (not shown) for operating wrapping machine 10 is mounted in a control cabinet 34.

The anvil assembly 30 (FIGS. 2-6) includes a first rotational axis or shaft 35 rotatably mounted in a pair of bearings 36 connected to a pair of end plates 37. An anvil 41 is secured to shaft 35 by a plurality of bolts 42. Anvil 41 includes a block 43 having a slot 44 with a soft rubber pad 48 and a hard rubber pad 49 (FIG. 6) mounted in slot 44. A low friction tape 50, such as fiberglass reinforced Teflon type, covers pad 49 to allow the heated thermoplastic film to slide easily over a surface 50a of anvil 41.

The film cutting assembly 29 (FIGS. 2-7) includes a second rotational axis or shaft 54 rotatably mounted in a pair of bearings 55 connected to the end plates 37. End plates 37 are connected to a portion 56 of wrapping machine 10 by a plurality of bolts 60 (FIG. 2) which are used to adjust the position of device 28 relative to the height of article 12. A mounting block 61a (FIGS. 2-5) connected to shaft 54 by a plurality of bolts 62 is pivotally connected to a plurality of film retaining arms 63a, 63b by a plurality of pivot pins 66a, 66b and a plurality of reaction pins 67a, 67b (FIGS. 2-7). Each pin 66a, 66b is pivotally mounted in mounting block 61a and each pin 67a, 67b is slidably mounted in a groove 68 in mounting block 61a. Mounting block 61a, as best seen in FIGS. 3, 4 includes a pair of bores 72a, 72b each having a pair of adjustable screws 73, 74 and a spring 75 mounted in the bore. Spring 75 is mounted between screw 73 and reaction pin 67b to bias retaining arm 63b in a counterclockwise direction about pivot pin 66b and to bias retaining arm 63a in a clockwise direction about pivot pin 66a. Adjustable screws 74 limit the amount of downward movement of pins 67a, 67b (FIG. 4) to limit the position of retaining arms 63a, 63b.

A heated sealing bar 79 (FIGS. 2-6) is connected to a heat insulating spacer 80 by a plurality of bolts 81 and spacer 80 is connected to shaft 54 by a plurality of bolts 82. A heater 86 and a temperature sensor 87 regulate the temperature of sealing bar 79. A pair of hollow liquid cooled film clamps 88a, 88b are spaced mounted on either side of sealing bar 79 and secured to film retaining arms 63a, 63b (FIGS. 2-7). A cooling liquid is piped to film clamps 88a, 88b through a central bore 99 in shaft 54 (FIGS. 2-7). A pair of pipes 93a, 93b and passages 94a, 94b supply cooling liquid to hollow film clamps 88a, 88b respectively. The liquid flows through clamps 88a, 88b to a passage (not shown) in mounting block 63d (FIG. 2), through a tube 98b and out of a bore 99 in shaft 54 to a pipe (not shown) for carrying the liquid from shaft 54 to a radiator or other cooling means. The liquid is then cooled and returned through bore 99 to the film clamps 88a, 88b.

A pair of gears 100a, 100b (FIG. 2) cause shafts 35 and 54 to rotate in opposite directions as shown by a pair of arrows 101a, 101b (FIGS. 3-5). As shafts 35, 54 rotate into the position shown in FIG. 5, film clamps 88a, 88b press against tape 50 and against the film 16 (FIG. 1) between tape 50 and clamps 88a, 88b to clamp the moving film. As shafts 35, 54 rotate into the position shown in FIGS. 3, 6 the heated sealing bar 79 presses against film 16 causing layers of the film to fuse together on either side of bar 79 and cutting the film into two sections. The shafts 35, 54 continue to rotate toward the position shown in FIG. 4 with the anvil 41 moved away from sealing bar 79 and film clamps 88a, 88b. At this time the thermoplastic tube 24 and the enclosed articles 12 (FIG. 1) advance through the area between shafts 35, 54 toward the right end of wrapping machine 10.

The cooled clamping bars prevent the film from adhering to the clamps and cause the fused layers of film to cool so the layers adhere together when the clamping bars are removed from a position against the thermoplastic film.

Although the best mode contemplated for carrying out the present invention has been herein shown and described, it will be apparent that modification and variation may be made without departing from what is regarded to be the subject matter of the invention.

What is claimed is:

1. A heat sealing and severing device for packing articles in tubular thermoplastic, said device comprising:
   an anvil assembly rotatable about a first rotational axis and having a resilient anvil surface spaced from said first rotational axis;
   a film cutting assembly rotatable about a second rotational axis parallel with said first rotational axis;
   a pair of hollow V-shaped clamping bars mounted on said cutting assembly with said bars being spaced apart with each of said bars being parallel with said second rotational axis and each of said bars having a narrow edge portion directed away from said first rotational axis;
   a heatable knife mounted on said cutting assembly with said knife mounted between said clamping bars with said knife parallel to said clamping bars and spaced apart from said clamping bars, said knife having a knife edge which is directed away from said second rotational axis;
   means for synchronously rotating said film cutting assembly and said anvil assembly to cause said clamping bars and said knife edge to contact said resilient anvil surface as said anvil assembly and said film cutting assembly rotate into a predetermined position about said first and second second axes;
   spring means for biasing said clamping bars away from said second rotational axis causing said narrow edge portion of each of said V-shaped clamping bars to contact said anvil surface before said knife edge contacts said anvil surface as said anvil surface is rotated into a position nearest to said film cutting assembly, and causing said narrow edge portion of each of said V-shaped clamping bars to remain in contact with said anvil surface after said knife edge has rotated away from said anvil surface; and
   means for providing a cooling liquid to each of said hollow clamping bars.

2. A heat sealing and severing device as defined in claim 1 including a slick anvil surface to facilitate movement of a thermoplastic across said anvil surface.

3. A heat sealing and severing device as defined in claim 1 including means for heating said knife to seal portions of a overlapped thermoplastic with said thermoplastic between said anvil assembly and said film cutting assembly, and to sever a portion of the thermoplastic which contains one article from an adjacent portion of the thermoplastic which contains another article.

4. A heat sealing and severing device as defined in claim 1 wherein said anvil assembly rotates in a circular path about said first rotational axis and said film cutting assembly rotates in a circular path about said second rotational axis.

5. A heat sealing and severing device as defined in claim 1 including means for controlling the distance said clamping bars are biased away from said second rotational axis to thereby control the amount of time said clamping bars are in contact with said anvil surface during the rotation of said film cutting assembly.

* * * * *